(12) United States Patent　　(10) Patent No.: US 7,434,562 B2
Ishimitsu　　(45) Date of Patent: Oct. 14, 2008

(54) INTERNAL COMBUSTION ENGINE WITH PARALLEL CRANKSHAFTS

(75) Inventor: Kengo Ishimitsu, Wako (JP)

(73) Assignee: Honda Motor Co, Ltd., Tokyo (JP)

( * ) Notice: Subject to any disclaimer, the term of this patent is extended or adjusted under 35 U.S.C. 154(b) by 0 days.

(21) Appl. No.: 11/699,005

(22) Filed: Jan. 29, 2007

(65) Prior Publication Data

US 2007/0175419 A1　Aug. 2, 2007

(30) Foreign Application Priority Data

Jan. 30, 2006　(JP)　............................ P2006-021071
Jan. 30, 2006　(JP)　............................ P2006-021158

(51) Int. Cl.
*F02B 75/24*　(2006.01)
*F02B 75/32*　(2006.01)
*F16C 7/00*　(2006.01)

(52) U.S. Cl. .............. 123/197.4; 123/197.2; 123/197.3; 123/59.6

(58) Field of Classification Search .............. 123/197.2, 123/197.3, 197.4, 55.2, 55.5, 55.7, 52.4, 123/52.6, 59.6
See application file for complete search history.

(56) References Cited

U.S. PATENT DOCUMENTS

| | | | | |
|---|---|---|---|---|
| 2,392,921 A | * | 1/1946 | Holman | ................... 123/197.4 |
| 4,690,113 A | * | 9/1987 | Deland | ..................... 123/197.4 |
| 5,056,314 A | * | 10/1991 | Paul et al. | ................... 123/561 |
| 5,058,537 A | * | 10/1991 | Paul et al. | ............... 123/51 BA |
| 5,397,922 A | * | 3/1995 | Paul et al. | ............... 123/149 R |
| 5,595,147 A | * | 1/1997 | Feuling | ..................... 123/52.4 |
| 5,674,053 A | * | 10/1997 | Paul et al. | ................... 417/228 |
| 5,680,840 A | * | 10/1997 | Mandella | ................. 123/197.4 |
| 5,682,844 A | * | 11/1997 | Wittner | ..................... 123/52.4 |
| 5,716,197 A | * | 2/1998 | Paul et al. | ................... 417/228 |
| 5,769,610 A | * | 6/1998 | Paul et al. | ................... 417/228 |
| 5,836,273 A | * | 11/1998 | Hair | ........................ 123/52.4 |
| 5,870,979 A | * | 2/1999 | Wittner | ..................... 123/52.4 |
| 5,873,333 A | * | 2/1999 | Wittner | ..................... 123/52.4 |
| 6,209,496 B1 | * | 4/2001 | Pelz | ........................ 123/59.6 |
| 6,447,268 B1 | * | 9/2002 | Abramopaulos | ............ 417/364 |

FOREIGN PATENT DOCUMENTS

JP　　62-107238 A　　5/1987

* cited by examiner

*Primary Examiner*—Stephen K. Cronin
*Assistant Examiner*—Ka Chun Leung
(74) *Attorney, Agent, or Firm*—Birch, Stewart, Kolasch & Birch, LLP.

(57) ABSTRACT

An internal combustion engine which includes two parallel crankshafts positioned in crankcases, a cylinder positioned on a side of the crankcases, a piston movably disposed within the cylinder, and connecting rods linked to the piston and extending from respective crankshafts. Positions at which the two connecting rods are linked to the piston and the crankshafts are constantly kept symmetrical with respect to a cylinder axis when the two crankshafts rotate in opposite directions.

6 Claims, 11 Drawing Sheets

BOTTOM DEAD CENTER OF EXPANSION STROKE

BOTTOM DEAD CENTER OF INTAKE STROKE

INTERNAL COMBUSTION ENGINE WITH PARALLEL CRANKSHAFTS

FIELD OF THE INVENTION

The present invention relates to an internal combustion engine that is provided with two crankshafts.

BACKGROUND OF THE INVENTION

An example of an internal combustion engine that is provided with two crankshafts is proposed in JP-A-62-107238, wherein each crankshaft is linked to a piston via connecting rods. This internal combustion engine will be described with reference to FIGS. 11 and 12 hereof.

In an engine 200 as shown in FIG. 11, a first crankshaft 201 and a second crankshaft 202 are positioned horizontally and in parallel. The first crankshaft 201 is connected to a first piston 206 by a first connecting rod 203, and the second crankshaft 202 is connected to a second piston 207 by a second connecting rod 204. A first cylinder 211 and a second cylinder 212 are positioned so that the cylinder axes are perpendicular to the first crankshaft 201 and the second crankshaft 202. The first piston 206 and the second piston 207 are movably disposed within the first cylinder 211 and the second cylinder 212, respectively.

As shown in FIG. 12, the first crankshaft 201 and the second crankshaft 202 are connected via a synchronizing device 221 for inducing synchronized rotation. The synchronizing device 221 is composed of: a first drive-gear 225 that is attached to the first crankshaft 201; a second drive-gear 226 that is attached to the second crankshaft 202; and a driven-gear 227 that engages the first drive-gear 225 and the second drive-gear 226. The driven-gear 227 is attached to an output axle 228.

The first connecting rod 203 and the second connecting rod 204 slant towards the cylinder axes of the first cylinder 211 and the second cylinder 212 when the first crankshaft 201 and the second crankshaft 202 rotate in FIG. 11. The first piston 206 and the second piston 207 are pushed against the cylinder walls of the first cylinder 211 and the second cylinder 212 due to thrust-generated on the first piston 206 and the second piston 207, resulting in increased resistance to sliding, noise generation, and the like.

The distance between the first crankshaft 201 and the second crankshaft 202 in FIGS. 11 and 12 is theoretically reduced when a smaller, more compact engine 200 is designed, but since the first drive-gear 225 and the second drive-gear 226 have prescribed diameters, the distance between the first crankshaft 201 and the second crankshaft 202 only shortens to the combined length of the radius of the first drive-gear 225 and the radius of the second drive-gear 226, at a minimum.

Accordingly, a smaller, more compact internal combustion engine wherein thrust does not act on the pistons has been needed.

SUMMARY OF THE INVENTION

According to a first aspect of the present invention, there is provided an internal combustion engine comprising: two parallel crankshafts positioned in crankcases; a cylinder positioned on a side of the crankcases; a piston movably disposed within the cylinder; and connecting rods linked to the piston and extending from each of the two crankshafts, wherein positions at which the crankshafts and the piston are linked to the two corresponding connecting rods are constantly kept symmetrical with respect to a cylinder axis when the two crankshafts rotate in opposite directions.

The slants of the two connecting rods are therefore symmetrical with respect to the cylinder axis in the internal combustion engine of the present invention. Thrust can be prevented from acting on the piston; resistance to sliding of the piston and the cylinder can be reduced; the piston can be lightened without the necessity of a skirt part for maintaining the alignment thereof; and high-speed rotation and fuel-consumption economy can be achieved. Additionally, wear on the piston can be reduced, and the occurrence of piston slap, which is produced when the piston hits the cylinder, can be minimized.

According to a second aspect of the present invention, there is provided an internal combustion engine comprising: two parallel crankshafts positioned in crankcases; a pair of cylinders provided to sides of both crankshafts and to a side of the crankcases so as to be aligned with a cylinder axis; pistons movably disposed within each of the cylinders; and connecting rods linked to each of the pistons and extending from the two crankshafts to each of the cylinders in the pair, wherein positions at which the crankshafts and the pistons are linked to the corresponding connecting rods linked to the corresponding pistons are constantly kept symmetrical with respect to a cylinder axis when the two crankshafts rotate in opposite directions, and the pistons in the pair each move horizontally.

The slants of the connecting-rod pairs of each piston are therefore symmetrical with respect to the cylinder axis in the horizontally-opposed internal combustion engine of the internal combustion engine of the present invention. Thrust can be prevented from acting on the pistons; resistance to sliding of the pistons and the cylinders can be reduced; the pistons can be lightened without the necessity of a skirt part for maintaining the alignment thereof; and high-speed rotation and fuel-consumption economy can be achieved. Additionally, wear on the sides of the pistons can be reduced, and the occurrence of piston slap, which is produced when the pistons hit the cylinders, can be minimized. Since the opposing cylinders are positioned on the same cylinder axis, there is no cylinder offset, a couple is not generated on the crankshafts during the respective strokes of the opposing pistons, and mechanical vibration can be completely cancelled out.

It is preferable for the piston and one of the two crankshafts to be linked with one connecting rod, for the piston and the other of the two crankshafts to be linked with two connecting rods and for one connecting rod to be positioned so as to be sandwiched by two connecting rods.

Since the pistons are supported by three connecting rods, the pistons can be stably supported and the generation of a couple in the pistons can be prevented.

According to a third aspect of the present invention, there is provided an internal combustion engine comprising: first and second cylinders provided to the side of crankcases; first and second crankshafts positioned in parallel in the crankcases; a first connecting rod linked at one end to the first crankshaft via a first crankpin; a first piston movably disposed within the first cylinder and linked to another end of the first connecting rod; a second connecting rod linked at one end to the second crankshaft via a second crankpin; and a second piston movably disposed within the second cylinder and linked to another end of the second connecting rod, a distance from an axis of the first crankshaft to the first crankpin and a distance from an axis of the second crankshaft to the second crankpin being equivalent, wherein the internal combustion engine further comprises pairs of first crank arms provided to the first crankshaft, formed in a tapered shape and supported on a tip by the first crankpin, and pairs of second crank arms provided to the second crankshaft, formed in a tapered shape and supported on a tip by the second crankpin, and wherein the first crank arms and the second crank arms are positioned in parallel, a length of the second crankpin is equivalent to a length of the first crankpin or is longer than the length of the first crankpin, or, alternatively, the length of the first crankpin is equivalent to the length of the second crankpin or is longer than the length of the second crankpin, and the first crank arms are capable of passing through an inner side of the second crank arms and the second crank arms are capable of passing through an inner side of the first crank arms when the first crankshaft and the second crankshaft are rotating.

The distance between the first crankshaft and the second crankshaft can thus be shortened in the internal combustion engine of the present invention, and the internal combustion engine can be made smaller and more compact.

An axis of the first crankpin is preferably able to be positioned further toward an axis of the second crankshaft and away from a straight line that passes through a center between the axis of the first crankshaft and the axis of the second crankshaft; and an axis of the second crankpin is preferably able to be positioned further toward the axis of the first crankshaft and away from the straight line.

The distance between the first crankshaft and the second crankshaft can thus be reduced further than in the conventional art, and the internal combustion engine can be made smaller and more compact.

BRIEF DESCRIPTION OF THE DRAWINGS

Certain preferred embodiments of the present invention will be described in detail below, by way of example only, with reference to the accompanying drawings, in which:

FIGS. 6A through 6C illustrates a piston of the internal combustion engine according to the present invention, wherein FIG. 6A is a sectional view of the piston, FIG. 6B is a sectional view taken along line b-b of FIG. 6A, and FIG. 6C is a view from the bottom of FIG. 6A;

FIGS. 7A and 7B are views showing a first stage operation of the crankshaft, connecting rod, and piston according to the present invention, wherein FIG. 7A is a diagram viewed from the direction extending out from the crankshafts, and FIG. 7B is a diagram viewed from arrow b of FIG. 7A;

FIGS. 8A and 8B are views showing a second stage operation of the crankshaft, connecting rod, and piston according to the present invention, wherein FIG. 8A is a diagram viewed from the direction extending out from the crankshafts, and FIG. 8B is a diagram viewed from arrow b of FIG. 8A;

FIGS. 9A and 9B are views showing a third stage operation of the crankshaft, connecting rod, and piston according to the present invention, wherein FIG. 9A is a diagram viewed from the direction extending out from the crank axis, and FIG. 9B is a diagram viewed from arrow b of FIG. 9A;

FIGS. 10A and 10B are views showing a fourth stage operation of the crankshaft, connecting rod, and piston according to the present invention, wherein FIG. 10A is a diagram viewed from the direction extending out from the crankshafts, and FIG. 10B is a diagram viewed from arrow b of FIG. 10A;

DESCRIPTION OF THE PREFERRED EMBODIMENTS

Figure 1:
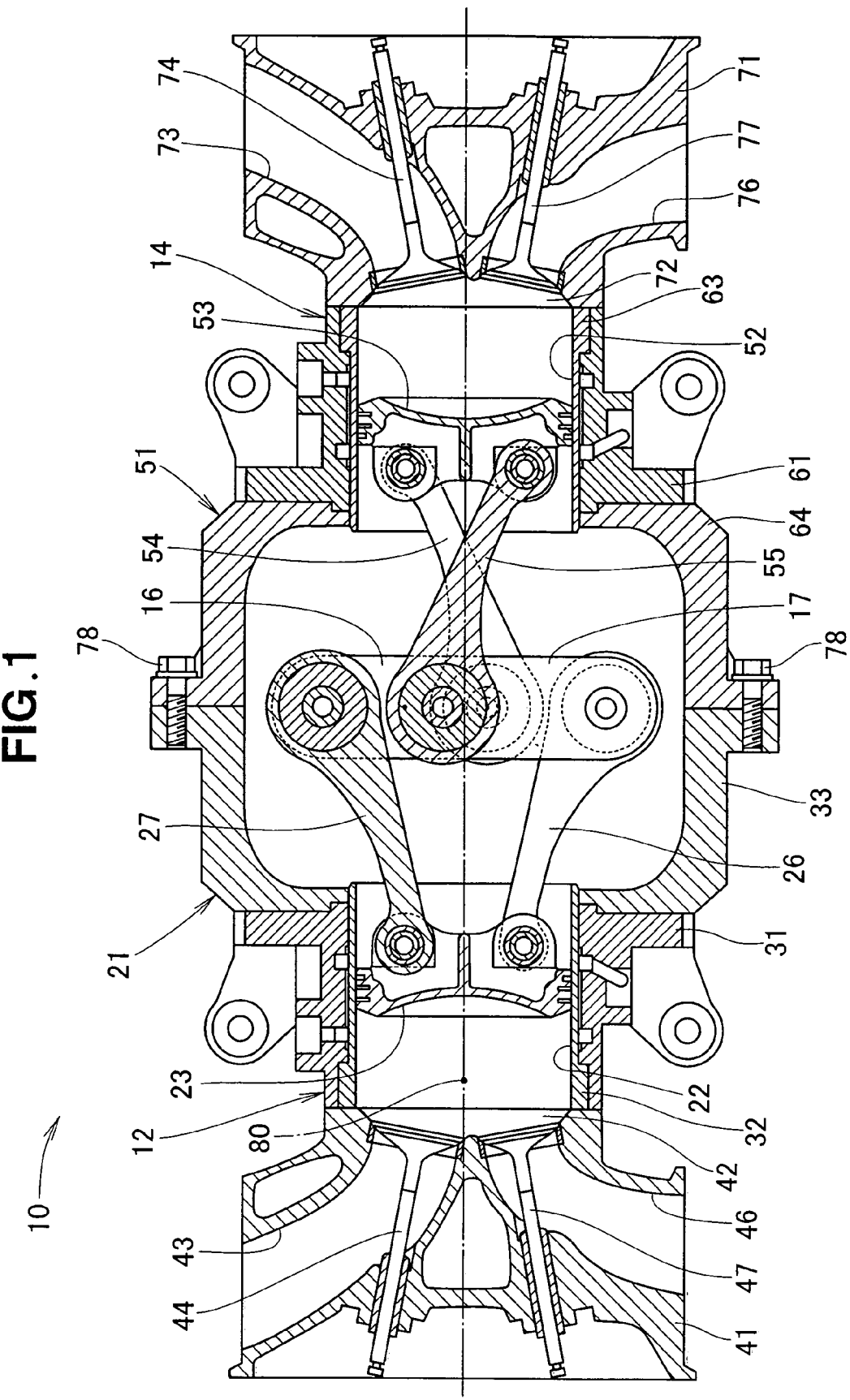
FIG. 1 is a sectional view of an internal combustion engine according to the present invention.

An internal combustion engine 10 is horizontally-opposed with two cylinders and is composed of a left cylinder 12 as a first cylinder and a right cylinder 14 as a second cylinder, as shown in FIG. 1. Two first and second crankshafts 16, 17 are rotatably attached between the left cylinder 12 and the right cylinder 14.

The left cylinder 12 is provided with: a left cylinder block 21; a first piston 23 that is movably disposed within a left cylinder bore 22 provided to the left cylinder block 21; a first connecting rod 26 and a third connecting rod 28 (not shown) that are linked to both the first piston 23 and the second crankshaft 17; and a second connecting rod 27 that is linked to both the first piston 23 and the first crankshaft 16.

The left cylinder block 21 is composed of: a main body 31 of the left cylinder; a cylindrical left sleeve 32 that forms the left cylinder bore 22 and is fit within the main body 31 of the left cylinder; and a left crankcase 33 that is attached to the main body 31 of the left cylinder.

Reference number 41 designates a left cylinder head that is attached to the side of the left cylinder block 21 via a head gasket (not shown). Reference number 42 designates a combustion chamber; reference number 43, an intake port; reference number 44, an intake valve; reference number 46, an exhaust port; and reference number 47, an exhaust valve.

The right cylinder 14 has the same basic structure as the left cylinder 12, and is provided with: a right cylinder block 51; a right cylinder bore 52; a second piston 53; a fourth connecting rod 54 and a sixth connecting rod 56 (not shown) that are linked to both the second piston 53 and the first crankshaft 16; and a fifth connecting rod 55 that is linked to both the second piston 53 and the second crankshaft 17.

The right cylinder block 51 is composed of a main body 61 of the right cylinder, a right sleeve 63, and a right crankcase 64. Reference number 71 designates a right cylinder head; reference number 72, a combustion chamber; reference number 73, an intake port; reference number 74, an intake valve; reference number 76, an exhaust port; and reference number 77, an exhaust valve. Reference number 78 designates a bolt that fastens together the left crankcase 33 and the right crankcase 64. Reference number 80 designates a cylinder axis that passes through the centers of the left cylinder bore 22 and the right cylinder bore 52.

Figure 2:
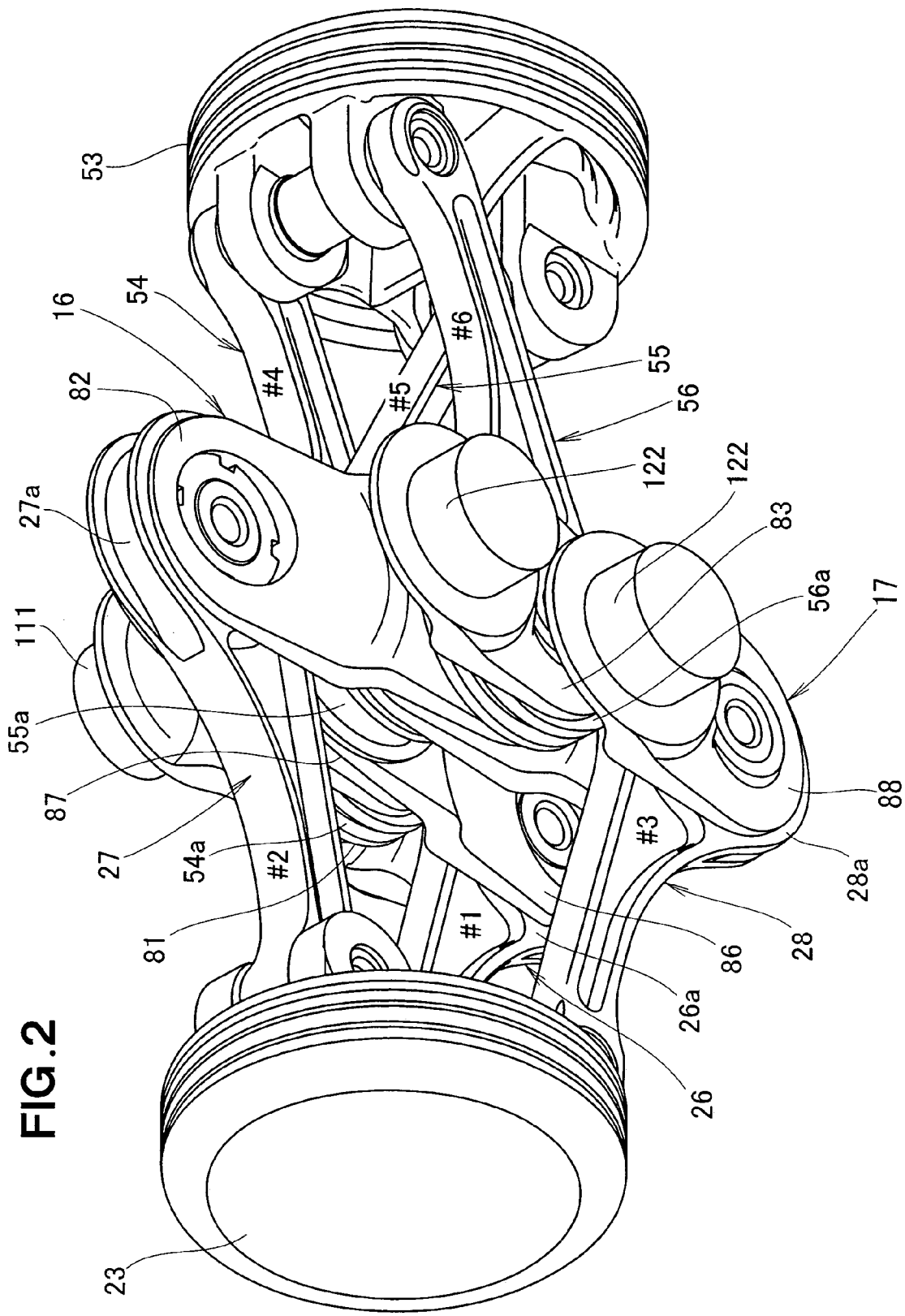
FIG. 2 is an oblique view showing an assembly of crankshafts, connecting rods, and pistons according to the present invention.

As shown in FIG. 2, a large end 54a of the fourth connecting rod 54 (designated "#4") is linked to a first crankpin 81 of the first crankshaft 16, a large end 27a of the second connecting rod 27 (designated "#2") is linked to a second crankpin 82 of the first crankshaft 16, and a large end 56a of the sixth connecting rod 56 (designated "#6") is linked to a third crankpin 83 of the first crankshaft 16. A large end 26a of the first connecting rod 26 (designated "#1") is linked to a first crankpin 86 of the second crankshaft 17, a large end 55a of the fifth connecting rod 55 (designated "#5") is linked to a second crankpin 87 of the second crankshaft 17, and a large end 28a of the third connecting rod 28 (designated "#3") is connected to a third crankpin 88 of the second crankshaft 17. Each of the small ends of the first connecting rod 26, the second connecting rod 27, and the third connecting rod 28 are linked to the first piston 23 via piston pins (described in detail hereinafter), and each of the small ends of the fourth connecting rod 54, the fifth connecting rod 55, and the sixth connecting rod 56 are connected to the second piston 53 via pistons pins (described in detail hereinafter).

The first piston 23 is thus supported by three connecting rods, the first connecting rod 26, the second connecting rod 27, and the third connecting rod 28; and the second piston 53 is supported by three connecting rods, the fourth connecting rod 54, the fifth connecting rod 55, and the sixth connecting rod 56. The first piston 23 and the second piston 53 are stably supported as a result.

Figure 3:
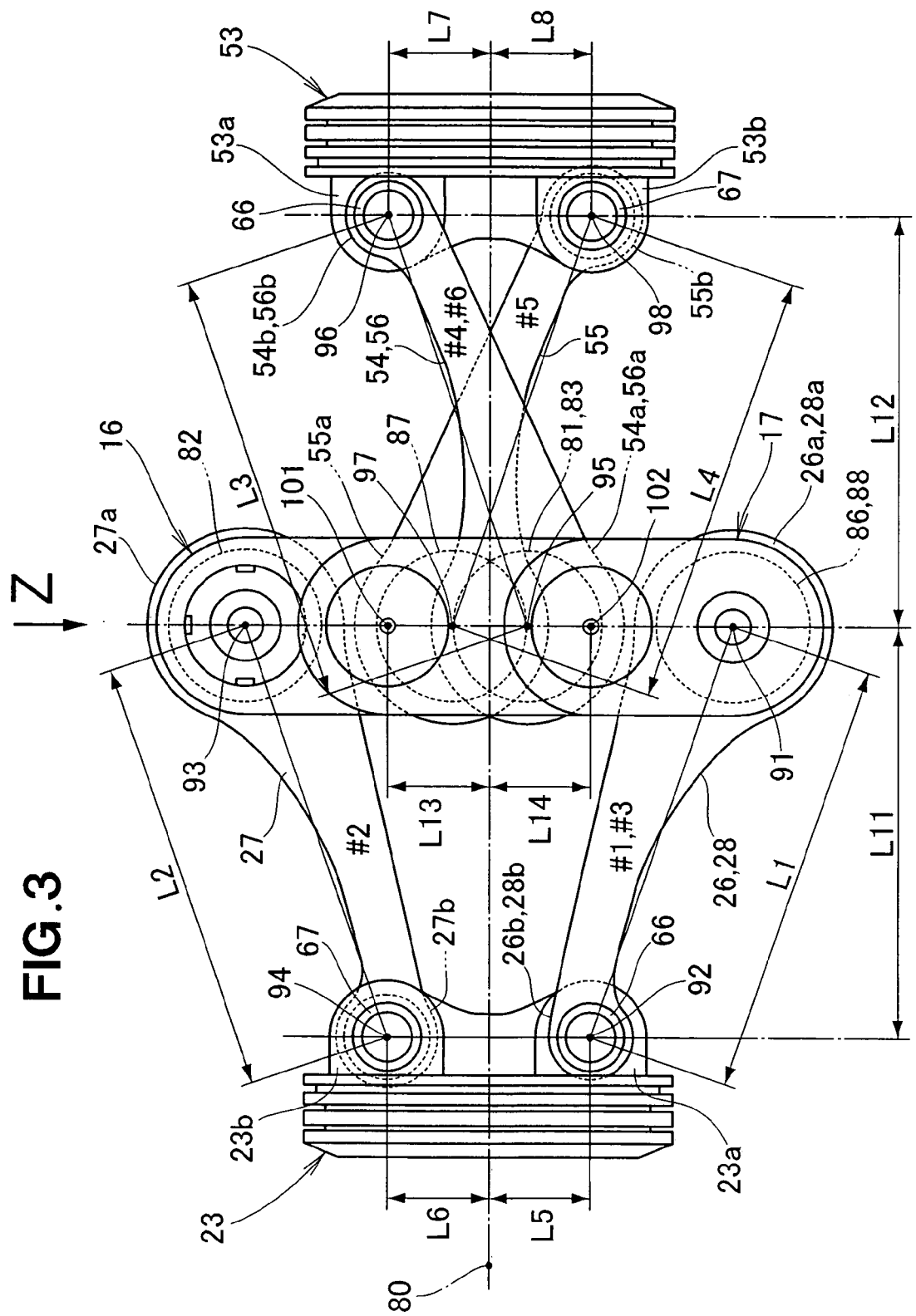
FIG. 3 is a side elevational view showing an assembly of crankshafts, connecting rods, and pistons according to the present invention.

The first piston 23 is a component that is linked to the first connecting rod 26 and the third connecting rod 28 (in the diagram, the third connecting rod 28 is positioned in front of the first connecting rod 26) by a first piston pin 66, and is linked to the second connecting rod 27 by a second piston pin 67, as shown in FIG. 3.

The second piston 53 is linked to the fourth connecting rod 54 and the sixth connecting rod 56 (the sixth connecting rod 56 is positioned in front of the fourth connecting rod 54) by the first piston pin 66, and is linked to the fifth connecting rod 55 by the second piston pin 67.

The first and third connecting rods 26, 28 and the fourth and sixth connecting rods 54, 56 have identical shapes. The second and fifth connecting rods 27, 55 also have identical shapes. Since the first and third connecting rods 26, 28 and the fourth and sixth connecting rods 54, 56 support larger loads, the cross-sectional area thereof is increased.

A point 91 is the center of the linkage between the large ends 26a, 28a of the first and third connecting rods 26, 28 and the first and third crankpins 86, 88 of the second crankshaft 17. A point 92 is the center of the linkage between small ends 26b, 28b of the first and third connecting rods 26, 28 and a first pin boss 23a of the first piston 23.

A point 93 is the center of the linkage between the large end 27a of the second connecting rod 27 and the second crankpin 82 of the first crankshaft 16. A point 94 is the center of the linkage between a small end 27b of the second connecting rod 27 and a second pin boss 23b of the first piston 23.

A point 95 is the center of the linkage between the large ends 54a, 56a of the fourth and sixth connecting rods 54, 56 and the first and third crankpins 81, 83 of the first crankshaft 16. A point 96 is the center of the linkage between small ends 54b, 56b of the fourth and sixth connecting rods 54, 56 and a first pin boss 53a of the second piston 53.

A point 97 is the center of the linkage between the large end 55a of the fifth connecting rod 55 and the second crankpin 87 of the second crankshaft 17. A point 98 is the center of the linkage between a small end 55b of the fifth connecting rod 55 and a second pin boss 53b of the second piston 53.

A distance L1 between the point 91 and the point 92 as indicated above, a distance L2 between the point 93 and the point 94, a distance L3 between the point 95 and the point 96, and a distance L4 between the point 97 and the point 98 are equivalent (L1=L2=L3=L4).

In other words, the mounting lengths of the connecting rods 26 through 28, 54 through 56 are equal to each other.

Furthermore, the point 91 and the point 93, the point 92 and the point 94, the point 95 and the point 97, and the point 96 and the point 98 described above are positioned symmetrically in relation to the cylinder axis 80.

Therefore, a distance L5 between the cylinder axis 80 and the point 92, a distance L6 between the cylinder axis 80 and the point 94, a distance L7 between the cylinder axis 80 and the point 96, and a distance L8 between the cylinder axis 80 and the point 98 are all equivalent (L5=L6=L7=L8). A distance L11, from crank axes 101, 102 of the first crankshaft 16 and second crankshaft 17, respectively, to the points 92, 94, and a distance L12, from the crank axes 101, 102 to the points 96, 98, are also equivalent (L11=L12).

A distance L13, from the cylinder axis 80 to the crank axis 101, and a distance L14, from the cylinder axis 80 to the crank axis 102, are also equivalent (L13=L14). The distances L13, L14 are equivalent to the aforementioned distances L5, L6, L7, L8.

The cylinder axis of the first piston 23 and the cylinder axis of the second piston 53 are aligned along an arrow Z in FIG. 3 (in other words, the first piston 23 and the second piston 53 have a common cylinder axis 80). The left cylinder bore 22 (see FIG. 1) and the right cylinder bore 52 (see FIG. 1) have no cylinder offset along the direction extending along the crank axes 101, 102 (the direction perpendicular to the page in FIG. 3).

Figure 4:
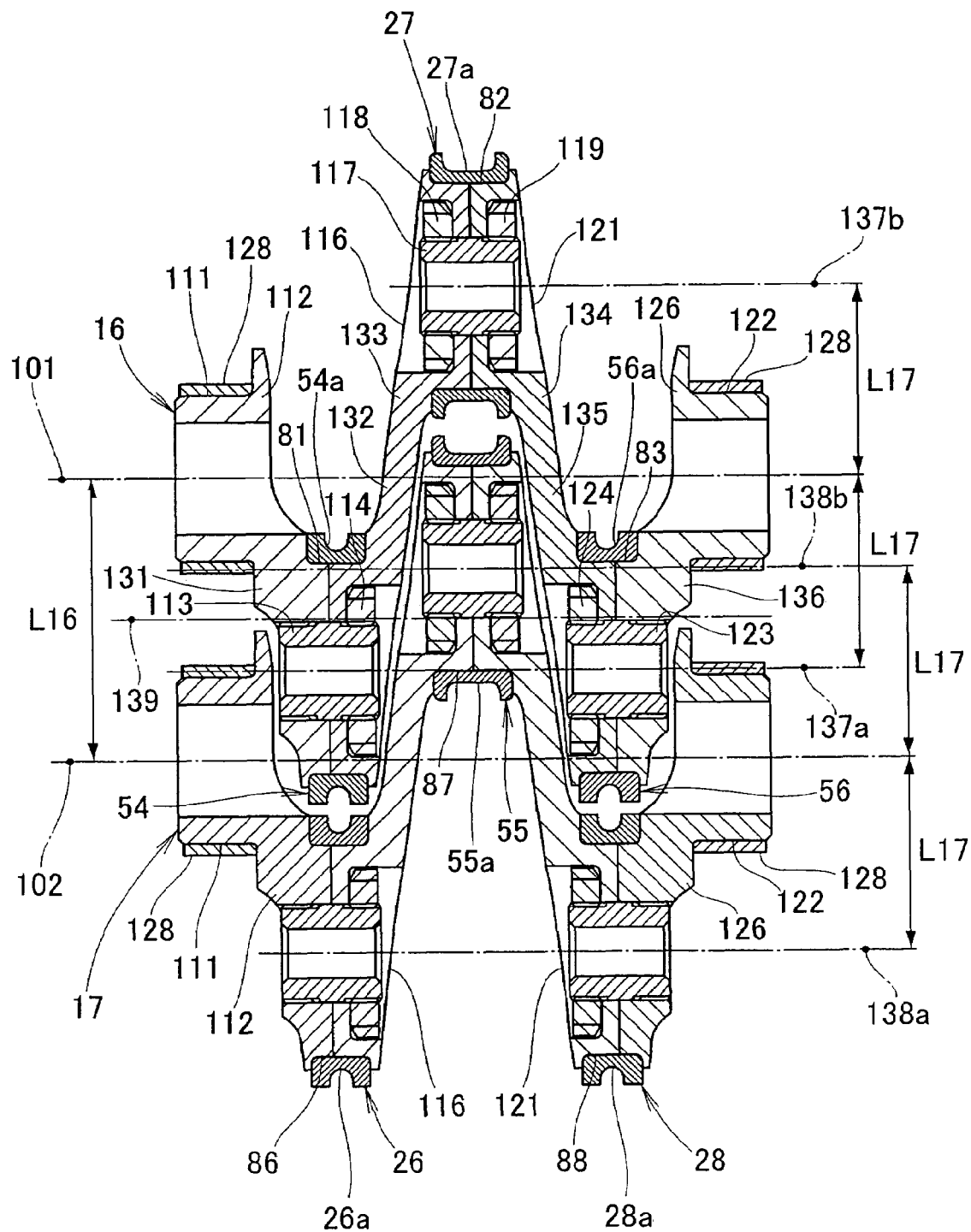
FIG. 4 is a sectional view of the first crankshaft and the second crankshaft according to the present invention.

The first crankshaft 16 and the second crankshaft 17 have identical shapes, as shown in FIG. 4. The crank axis 101 and the crank axis 102 are positioned in parallel and in closer proximity than in the conventional art. The first crankshaft 16 will be described in detail below, but only the essentials of the second crankshaft 17 will be described.

The first crankshaft 16 is composed of: a first member 112 that has a journal 111 formed on an end thereof; a second member 116 that is attached to the first member 112 by a hollow bolt 113 and a nut 114; a third member 121 that is attached to the second member 116 by a hollow bolt 117 and nuts 118, 119; and a fourth member 126 that has a journal 122 formed on an end thereof and is attached to the third member 121 by a hollow bolt 123 and a nut 124. Reference number 128 designates a bearing that is provided between the left crankcase 33 (see FIG. 1) and the right crankcase 64 (see FIG. 1) on one side and the journals 111, 122 on the other side.

The first member 112 and the second member 116 are members that form a first arm 131, the first crankpin 81, a second arm 132, and a third arm 133. The large end 54a of the fourth connecting rod 54 is swingably linked to the first crankpin 81.

The second member 116 and the third member 121 are members that form the second crankpin 82, a fourth arm 134, and a fifth arm 135. The large end 27a of the second connecting rod 27 is swingably linked to the second crankpin 82.

The third member 121 and the fourth member 126 are members that form the third crankpin 83 and a sixth arm 136. The large end 56a of the sixth connecting rod 56 is swingably linked to the third crankpin 83.

The first member 112 and the second member 116 of the second crankshaft 17 are members that form the first crankpin 86. The large end 26a of the first connecting rod 26 is swingably linked to the first crankpin 86.

The second member 116 and the third member 121 of the second crankshaft 17 are members that form the second crankpin 87. The large end 55a of the fifth connecting rod 55 is swingably linked to the second crankpin 87.

The third member 121 and the fourth member 126 of the second crankshaft 17 are members that form the third crankpin 88. The large end 28a of the third connecting rod 28 is swingably linked to the third crankpin 88.

A distance L16 between the first crankshaft 16 and the second crankshaft 17 is the distance between the crank axes 101, 102 in the drawings and is a combination of the distance L13 and the distance L14 shown in FIG. 3. In other words, L16=L13+L14.

L17 is identical both to the distance from the crank axis 101 to an axis 137a of the first crankpin 81 and the third crankpin 83 and to the distance from the crank axis 101 to an axis 137b of the second crankpin 82. The distance L17 is half the length of the stroke of the first and second pistons 23, 53 (see FIG. 3).

The distance from the crank axis 102 to an axis 138a of the first crankpin 86 and the third crankpin 88, as well as the distance from the crank axis 102 to an axis 138b of the second crankpin 87 are also identical to L17.

The axis 138b of the second crankshaft 17 is positioned further to the side of the first crank axis 101 than the axis 137a of the first crankshaft 16 and is also positioned further to the side of the first crank axis 101 than a straight line 139 that passes through the center of the first crank axis 101 and the second crank axis 102.

When the first crankshaft 16 and the second crankshaft 17 rotate 18020 around the first crank axis 101 and the second crank axis 102, respectively, the axis 137b of the first crankshaft 16 is positioned further to the side of the second crank axis 102 than the axis 138a of the second crankshaft 17 and is also positioned further to the side of the second crank axis 102 than the straight line 139.

The distance L16 between the first crankshaft 16 and the second crankshaft 17 can thus be made shorter than in the conventional art, and the internal combustion engine can be made smaller and more compact.

The smallest distance between the first crankshaft 16 and the second crankshaft 17 is determined by the outside diameters of the large ends 26a, 28a, 54a, 56a, error in component manufacture, and the clearance between the adjoining large ends (in the drawings, the clearance between the large ends 26a, 54a and the clearance between the large ends 28a, 56a) that are subjected to the effects of heat expansion.

Figure 5:
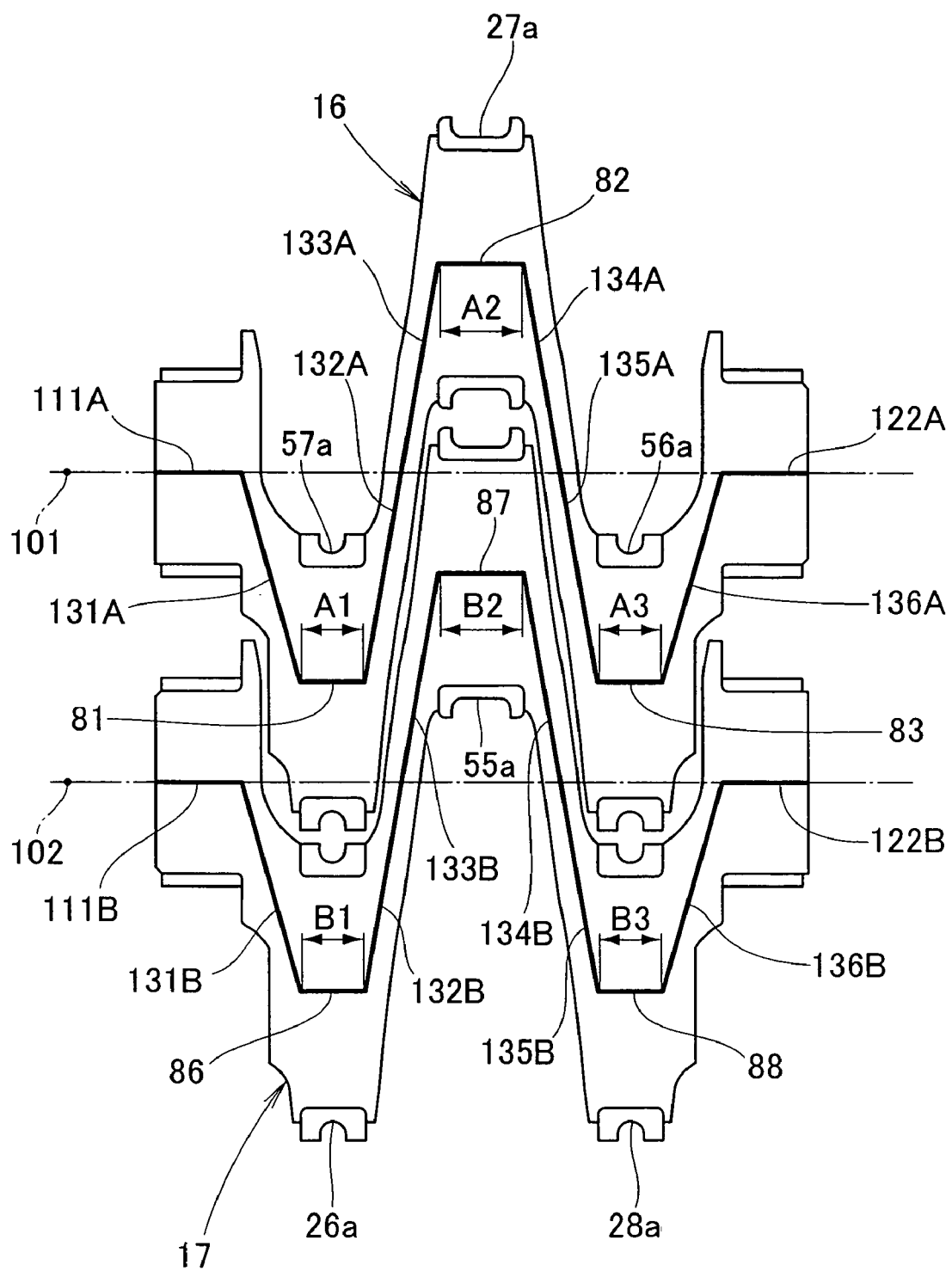
FIG. 5 is a schematic view of the first crankshaft and the second crankshaft according to the present invention.

The shapes of the first crankshaft 16 and the second crankshaft 17 are schematically shown by the thick lines in FIG. 5. The description below will focus on the parts designated by thick lines. When it proves necessary in order to distinguish the parts of the first crankshaft 16 and the parts of the second crankshaft 17, "A" will be appended to the end of notation referring to components of the first crankshaft 16, and "B" will be appended to the end of notation referring to components the second crankshaft 17.

The first crankshaft 16 is composed of: the journal 111A; the first arm 131A that extends diagonally from the journal 111A; the first crankpin 81 that is provided to the end of the first arm 131A; the second arm 132A and the third arm 133A that extend diagonally from the first crankpin 81 in a substantially straight line; the second crankpin 82 that is provided to the end of the third arm 133A; the fourth arm 134A and the fifth arm 135A that extend diagonally from the second crankpin 82 in a substantially straight line; the third crankpin 83 that is provided to the end of the fifth arm 135A; the sixth arm 136A that extends diagonally from the third crankpin 83; and the journal 122A that is provided to the end of the sixth arm 136A.

The crank axis 101 serves as the boundary of the aforementioned second arm 132A and third arm 133A, as well as of the fourth arm 134A and the fifth arm 135A.

The journal 111A, the first crankpin 81, the second crankpin 82, the third crankpin 83, and the journal 122A are designated by a thick line that is drawn to pass through the centers of the outside diameters thereof.

The second crankshaft 17 is similarly composed of the journal 111B, the first arm 131B, the first crankpin 86, the second arm 132B and the third arm 133B, the second crankpin 87, the fourth arm 134B and the fifth arm 135B, the third crankpin 88, the sixth arm 136B, and the journal 122B.

The crank axis 102 serves as the boundary of the aforementioned second arm 132B and third arm 133B, as well as of the fourth arm 134B and the fifth arm 135B.

The journal 111B, the first crankpin 86, the second crankpin 87, the third crankpin 88, and the journal 122B are designated by a thick line that is drawn to pass through the centers of the outside diameters thereof.

In the aforementioned first crankshaft 16, the first arm 131A, the second arm 132A, the third arm 133A, the fourth arm 134A, the fifth arm 135A, and the sixth arm 136A all slant from a direction perpendicular to the crank axes 101, 102. In the second crankshaft 17, the first arm 131B, the second arm 132B, the third arm 133B, the fourth arm 134B, the fifth arm 135B, and the sixth arm 136B all extend diagonally from a direction perpendicular to the crank axes 101, 102.

The first arm 131A and the second arm 132A, the third arm 133A and the fourth arm 134A, the fifth arm 135A and the sixth arm 136A, and the second arm 132A and the fifth arm 135A all form tapered shapes. The first arm 131B and the second arm 132B, the third arm 133B and the fourth arm 134B, the fifth arm 135B and the sixth arm 136B, and the second arm 132B and the fifth arm 135B all form tapered shapes.

The first arm 131A and the first arm 131B, the second arm 132A and the second arm 132B, the third arm 133A and the third arm 133B, the fourth arm 134A and the fourth arm 134B, the fifth arm 135A and the fifth arm 135B, and the sixth arm 136A and the sixth arm 136B are parallel.

A length A1 of the first crankpin 81 is equivalent to a length B1 of the first crankpin 86; a length A2 of the second crankpin 82 is equivalent to a length B2 of the second crankpin 87; and a length A3 of the third crankpin 83 is equivalent to a length B3 of the third crankpin 88.

In FIG. 5, the first crankpin 81 is capable of passing through the inner side of the first crankpin 86, the second crankpin 87 is capable of passing through the inner side of the second crankpin 82, and the third crankpin 83 is capable of passing through the inner side of the third crankpin 88, but A1>B1, B2>A2, A3>B3 is acceptable.

With such an arrangement, the first crankpin 86 is capable of passing through the inner side of the first crankpin 81, the second crankpin 82 is capable of passing through the inner side of the second crankpin 87, and the third crankpin 88 is capable of passing through the inner side of the third crankpin 83 even when the first crankshaft 16 and the second crankshaft 17 rotate 180° round the crank axes 101, 102, respectively, from the state shown in FIG. 5. A1<B1, B2<A2, A3<B3 is also acceptable.

The tapered-form third arm 133B and fourth arm 134B, as well as the tapered-form second arm 132B and fifth arm 135B are inserted more easily in the above manner between the tapered-form third arm 133A and fourth arm 134A and between the tapered-form second arm 132A and fifth arm 135A, for example. In other words, these components are more easily positioned in close proximity. The distance between the first crankshaft 16 and the second crankshaft 17 can therefore be reduced, and the internal combustion engine can be made smaller.

Figure 6A:
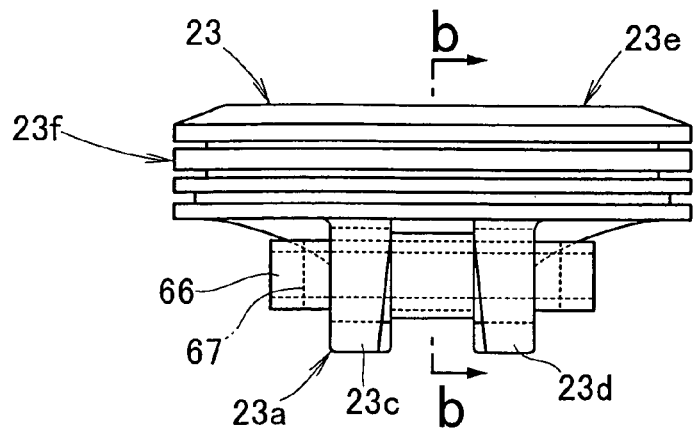

In FIG. 6A, the first piston 23 is in a raised state, the first piston pin 66 is inserted in the first pin boss 23a, and the second piston pin 67 is inserted in the second pin boss 23b (not shown). The second piston 53 has a structure that is identical to that of the first piston 23.

The first piston 23 is not subject to thrust, and therefore a skirt for controlling piston alignment within the cylinder is not used. The first pin boss 23a is composed of a pair of pin-boss halves 23c, 23d, which protrude downward.

Figure 6B:
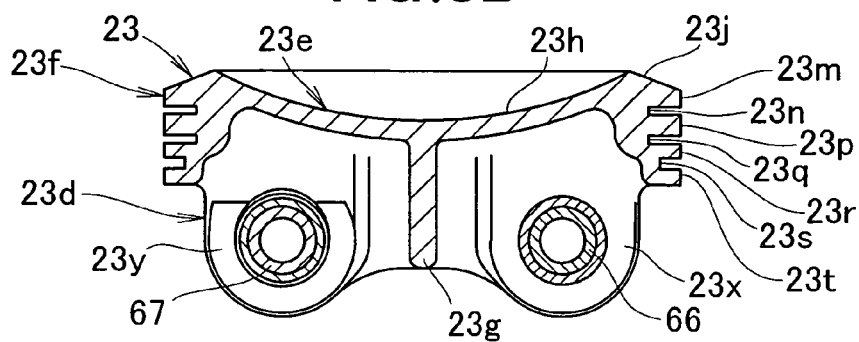

As shown in FIG. 6B, the first piston 23 is composed of: a head 23e; a land 23f that is integrally formed with the outer periphery of the head 23e; the pin-boss halves 23c, 23d (only 23d is shown in FIG. 6B) that protrude downward from the head 23e and the land 23f; and a longitudinal rib 23g that links and reinforces the pin-boss halves 23c, 23d and the head 23e.

The head 23e has a head surface 23h that is curved in a concave shape in order to form the combustion chamber; and a tapered part 23j that is formed on the outer edge of the head surface 23h in order to generate squish.

In order from the side of the tapered part 23j, the land 23g forms a top land 23m, a top ring groove 23n, a second land 23p, a second ring groove 23q, a third land 23r, an oil ring groove 23s, and a bottom land 23t.

Figure 6C:
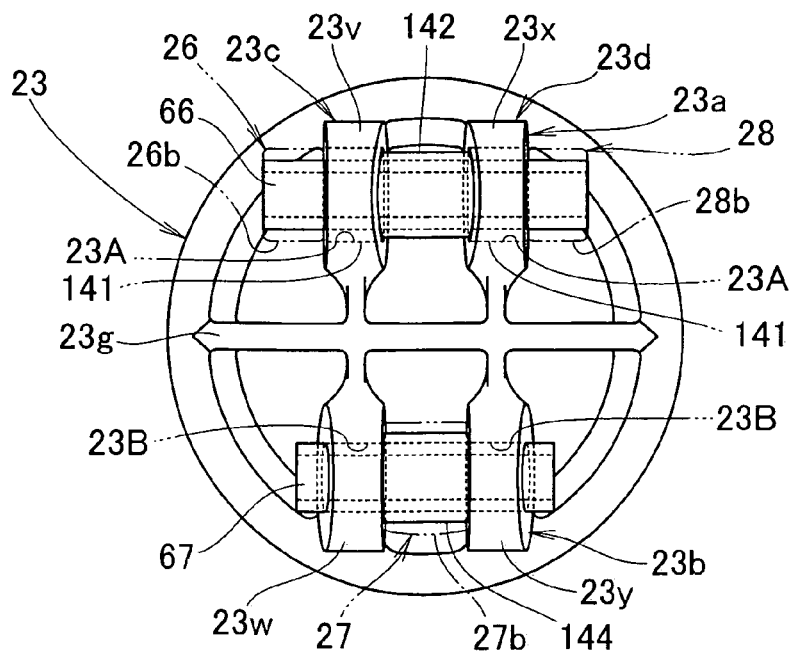

As shown in FIG. 6C, the pin-boss half 23c is composed of a first protrusion 23v and a second protrusion 23w that are bounded by the longitudinal rib 23g, and the pin-boss half 23d is composed of a first protrusion 23x and a second protrusion 23y that are bounded by the longitudinal rib 23g.

The first protrusion 23v and the first protrusion 23x constitute the first pin boss 23a, and the second protrusion part 23w and the second protrusion part 23y constitute the second pin boss 23b. Reference number 23A designates a first pin hole through which passes the first piston pin 66, and reference number 23B designates a second pin hole through which passes the second piston pin 67.

The first piston pin 66 is fit in the first pin holes 23A, 23A via bearings 141, 141. Reference number 142 designates a collar into which the first piston pin 66 is inserted and which is positioned between the bearings 141, 141.

The small end 26b of the first connecting rod 26 and the small end 28b of the third connecting rod 28 are fit (press fit) in the sections of the first piston pin 66 that protrude out farther than the first protrusion part 23v and the first protrusion part 23x.

The second piston pin 67 is fit (press fit) in the second pin holes 23B, 23B. The small end 27b of the second connecting rod 27 is fit between the second protrusion 23w and the second protrusion 23y of the second piston pin 67 via a bearing 144.

Two connecting rods; i.e., the first connecting rod 26 and the third connecting rod 28, are linked to the first piston 23 by the first piston pin 66. One connecting rod; i.e., the second connecting rod 27, is linked to the first piston 23 by the second piston pin 67. Thrust generated due to the slant of the second connecting rod 27 (acting in the vertical direction in FIG. 6C) and thrust generated due to the slant of the first connecting rod 26 and the third connecting rod 28 (acting in the vertical direction in FIG. 6C) pass through the center of the first piston 23, for example, and can be positioned on the same plane, which extends in the vertical direction in FIG. 6C, allowing the generation of a couple on the first piston 23 (acting in the direction that causes the first piston 23 to rotate on the page) to be prevented.

Of the two crankshafts, the first crankshaft 16 and the second crankshaft 17 described above using FIGS. 2 and 6, the first crankshaft 16 is linked to the first piston 23 by one connecting rod; i.e., the second connecting rod 27. The other of the two crankshafts, the second crankshaft 17, is linked to the first piston 23 by two connecting rods; i.e., the first and third connecting rods 26, 28. One connecting rod, i.e., the second connecting rod 27, is sandwiched in position by two connecting rods; i.e., the first and third connecting rods 26, 28.

Of the two crankshafts, i.e., the first crankshaft 16 and the second crankshaft 17, the second crankshaft 17 is linked to the second piston 53 by one connecting rod; i.e., the fifth connecting rod 55. The other of the two crankshafts; i.e., the first crankshaft 16, is linked to the second piston 53 by two connecting rods; i.e., the fourth and sixth connecting rods 54, 56. One connecting rod, i.e., the fifth connecting rod 55, is sandwiched in position by the two connecting rods; i.e., the fourth and sixth connecting rods 54, 56.

Since the first piston 23 is accordingly supported by each of the three connecting rods 26 through 28, and the second piston 53 is supported by each of the three connecting rods 54 through 56, the first piston 23 and the second piston 53 can be stably supported, and the generation of a couple in the first piston 23 and the second piston 53 can also be prevented.

The operation of each of the aforedescribed crankshafts, connecting rods, and pistons will be described next.

Figure 7A:
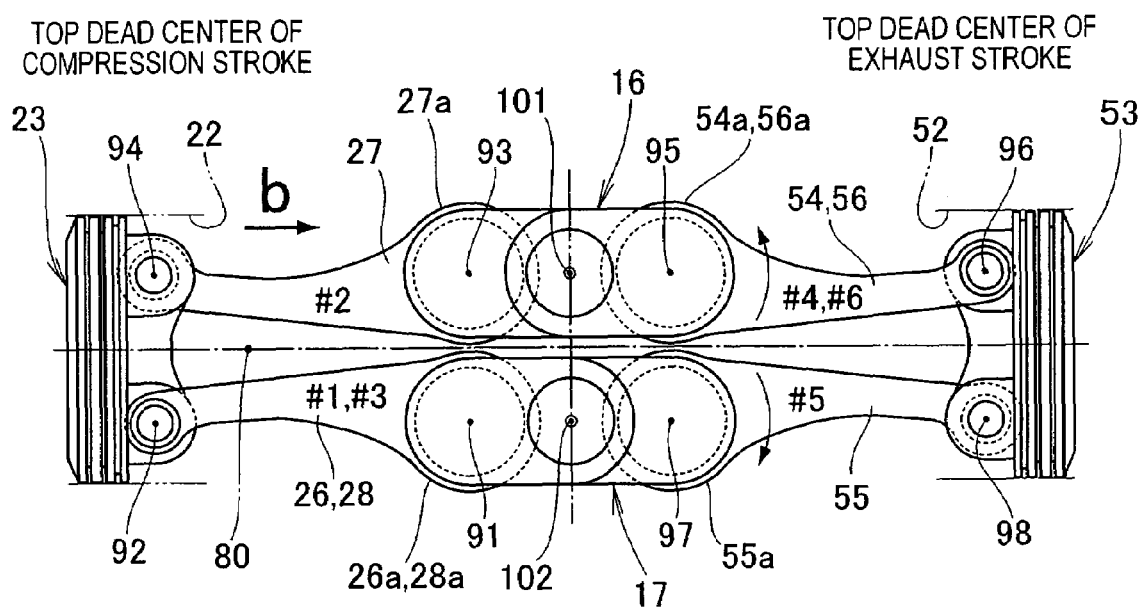
Figure 7B:
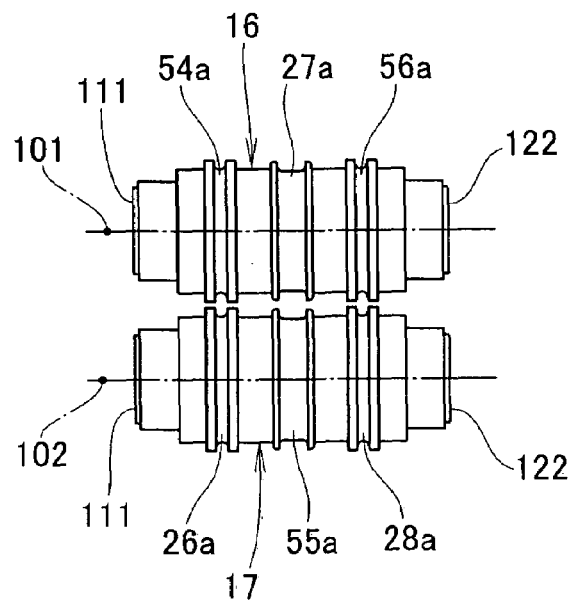

FIGS. 7A and 7B show a crank angle of 0°; i.e., a state wherein the first piston 23 is positioned at the top dead center of the compression stroke and the second piston 53 is positioned at the top dead center of the exhaust stroke.

When viewed from the direction extending from the crank axes 101, 102, as in FIG. 7A, the second connecting rod 27, the first crankshaft 16, and the fourth and sixth connecting rods 54, 56 form a straight line; the first and third connecting rods 26, 28, the second crankshaft 17, and the fifth connecting rod 55 form a straight line; and the first crankshaft 16 and the second crankshaft 17 do not overlap. The unlabelled arrows in FIG. 7A designate the directions of rotation of the first crankshaft 16 and the second crankshaft 17 (the same applies through FIG. 10 below). In other words, the first crankshaft 16 and the second crankshaft 17 rotate in opposite directions.

As shown in FIG. 7B, the large end 27a of the second connecting rod is positioned further to the front than the large end 54a of the fourth connecting rod and the large end 56a of the sixth connecting rod. The large end 55a of the fifth connecting rod is positioned further in the interior than the large end 26a of the first connecting rod and the large end 28a of the third connecting rod.

Figure 8A:
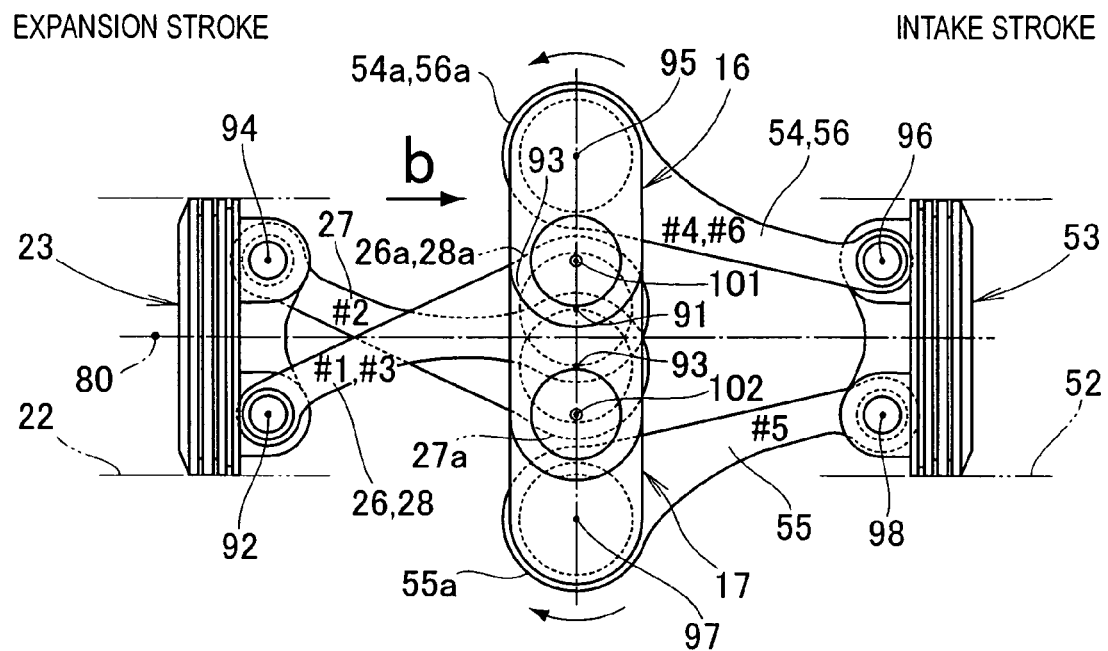
Figure 8B:
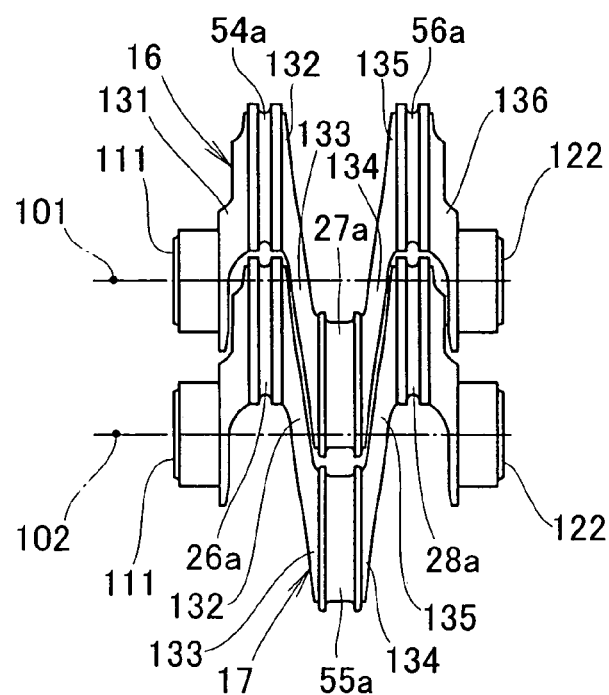

FIGS. 8A and 8B show a crank angle of 90°; i.e., a state wherein the first piston 23 is positioned in the expansion stroke and the second piston 53 is positioned in the intake stroke. When viewed from the direction extending from the crank axes 101, 102, as in FIG. 8A, the first and third connecting rods 26, 28 and the second connecting rod 27 form an X-shape; the fourth and sixth connecting rods 54, 56 and the fifth connecting rod 55 form a V-shape; and the first crankshaft 16 and the second crankshaft 17 overlap.

Since the resultant force of the explosive force on the head 23e and the inertia force acts in the direction of the cylinder axis 80 on the side of the first piston 23 in the expansion stroke, a thrust is generated in a direction facing further to the bottom of FIG. 8A than the slant of the first and third connecting rods 26, 28 relative to the cylinder axis 80, and a thrust is generated in a direction facing further to the top of FIG. 8A than the slant of the second connecting rod 27 relative to the cylinder axis 80. However, these thrusts have the same magnitude, and therefore cancel each other out. As a result, thrust does not act on the first piston 23. The same applies for the second piston 53.

As shown in FIG. 8B, the large end 27a on the side of the first crankshaft 16 penetrates to the inner side of the second arm 132, the third arm 133, the fourth arm 134, and the fifth arm 135 of the second crankshaft 17. The large end 26a on the side of the second crankshaft 17 penetrates to the inner side of the first arm 131, the second arm 132, and the third arm 133 of the first crankshaft 16. The large end 28a on the side of the second crankshaft 17 penetrates to inner side of the fourth arm 134, the fifth arm 135, and the sixth arm 136 of the first crankshaft 16. The space between the first crankshaft 16 and the second crankshaft 17 can therefore be made extremely small.

Figure 9A:
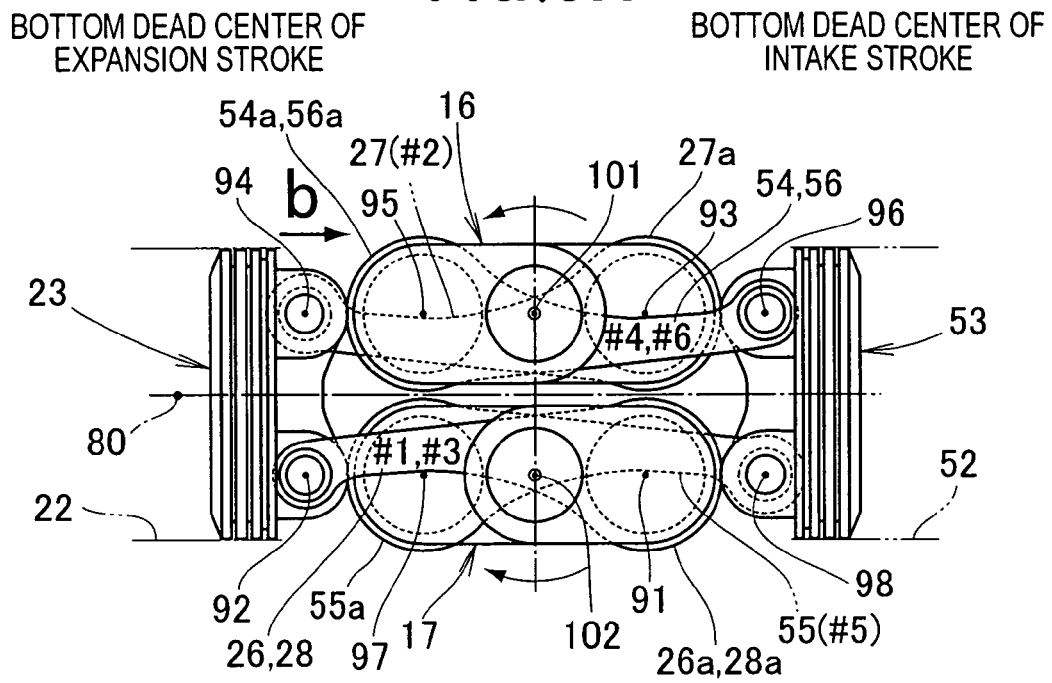
Figure 9B:
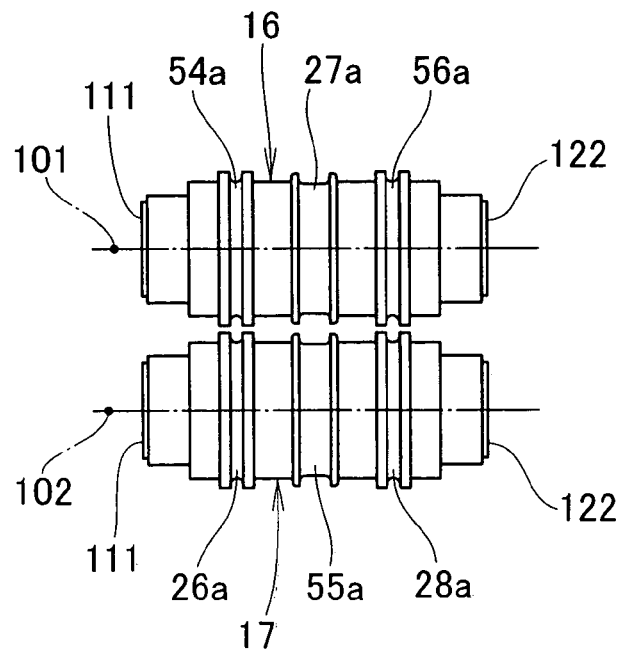

FIGS. 9A and 9B show a crank angle of 180°; i.e., a state wherein the first piston 23 is positioned at the bottom dead center of the expansion stroke and the second piston 53 is positioned in the bottom dead center of the intake stroke. When viewed from the direction extending from the crank axis 101, 102, as in FIG. 9A, the second connecting rod 27, the first crankshaft 16, and the fourth and sixth connecting rods 54, 56 overlap; the first and third connecting rods 26, 28, the second crankshaft 17, and the fifth connecting rod 55 overlap; but the first crankshaft 16 and the second crankshaft 17 do not overlap.

As shown in FIG. 9B, the large end 27a of the second connecting rod is positioned further in the interior than the large end 54a of the fourth connecting rod and the large end 56a of the sixth connecting rod. The large end 55a of the fifth connecting rod is positioned further to the front than the large end 26a of the first connecting rod and the large end 28a of the third connecting rod.

Figure 10A:
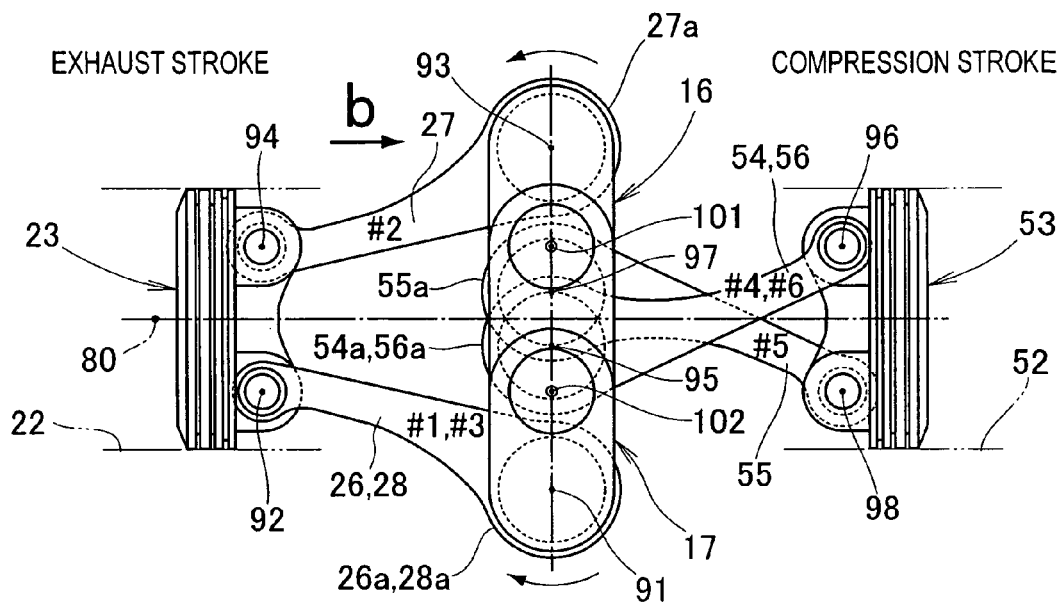
Figure 10B:
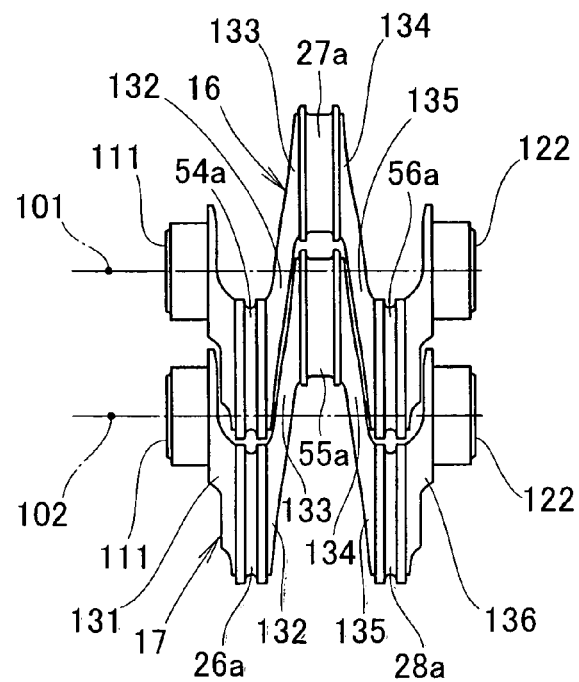
Figure 11:
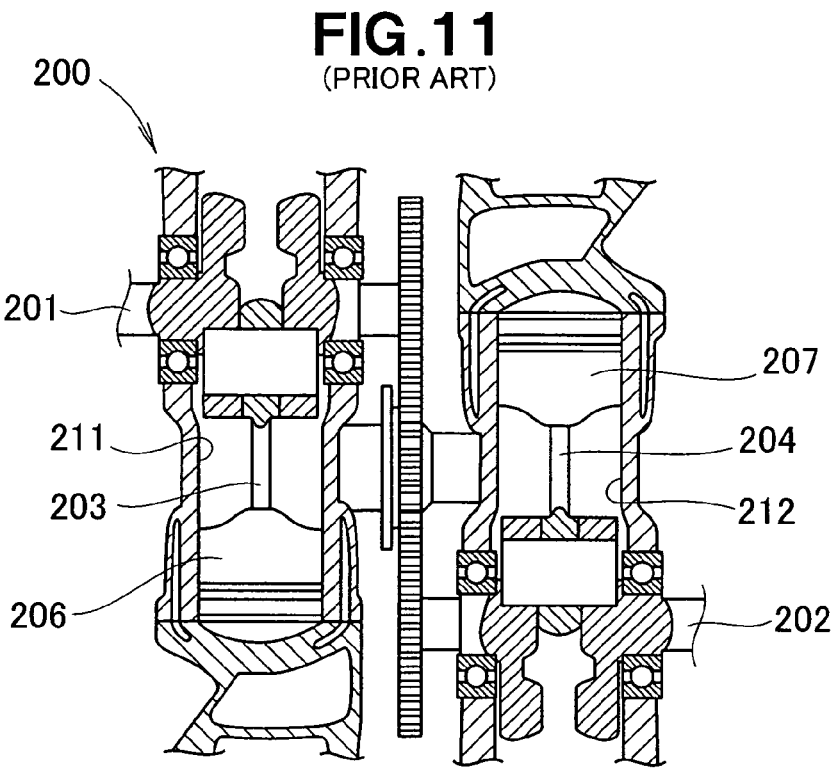
FIG. 11 is a sectional view of a conventional internal combustion engine.
Figure 12:
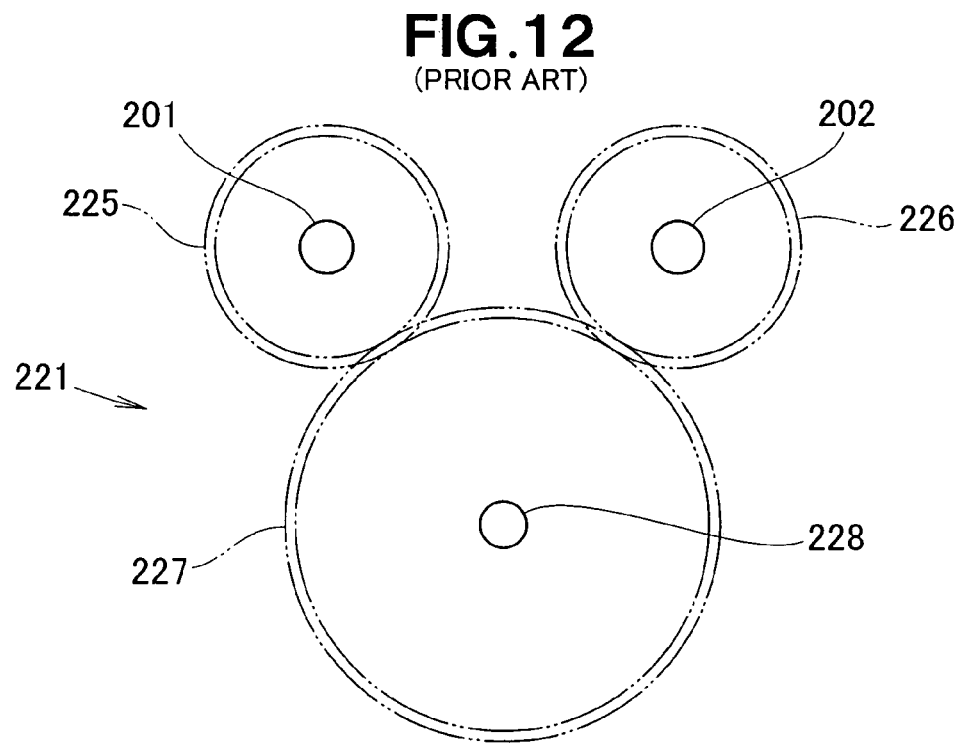
FIG. 12 is a schematic view showing a synchronizing device of a conventional internal combustion engine.

FIGS. 10A and 10B show a crank angle of 270°; i.e., a state wherein the first piston 23 is positioned in the exhaust stroke and the second piston 53 is positioned in the compression stroke. When viewed from the direction extending from the crank axes 101, 102, as in FIG. 10A, the first and third connecting rods 26, 28 and the second connecting rod 27 form a V-shape; the fourth and sixth connecting rods 54, 56 and the fifth connecting rod 55 form a X-shape; and the first crankshaft 16 and the second crankshaft 17 overlap.

As shown in FIG. 10B, the large end 54a on the side of the first crankshaft 16 penetrates to the inner side of the first arm 131, the second arm 132, and the third arm 133 of the second crankshaft 17. The large end 56a on the side of the first crankshaft 16 penetrates to the inner side of fourth arm 134, the fifth arm 135, and the sixth arm 136 of the second crankshaft 17. The large end 55a on the side of the second crankshaft 17 penetrates to inner side of the second arm 132, the third arm 133, the fourth arm 134, and the fifth arm 135 of the first crankshaft 16. The space between the first crankshaft 16 and the second crankshaft 17 can therefore be made extremely small.

The internal combustion engine of the present embodiment is shown in FIG. 1 as horizontally-opposed with two cylinders however, the present invention is not limited thereto, and may be horizontally-opposed with four cylinders, six cylinders, or another even number of cylinders.

Obviously, various minor changes and modifications of the present invention are possible in light of the above teaching. It is therefore to be understood that within the scope of the appended claims the invention may be practiced otherwise than as specifically described.

What is claimed is:

1. An internal combustion engine comprising:
    a right crankcase half and a left crankcase half which join together to form a crankcase;
    a first cylinder and a second cylinder provided, respectively, in the right and left crankcase halves;
    first and second crankshafts positioned parallel to each other within the crankcase;
    a first connecting rod linked at one end to the first crankshaft via a first crankpin;
    a first piston movably disposed within the first cylinder and linked to another end of the first connecting rod;
    a second connecting rod linked at one end to the second crankshaft via a second crankpin; and
    a second piston movably disposed within the second cylinder and linked to another end of the second connecting rod,
    a distance from an axis of the first crankshaft to the first crankpin and a distance from an axis of the second crankshaft to the second crankpin being equivalent,
    wherein the internal combustion engine further comprises:
    pairs of first crank arms provided to the first crankshaft, formed in a tapered shape and supported on a tip by the first crankpin; and pairs of second crank arms provided to the second crankshaft, formed in a tapered shape and supported on a tip by the second crankpin, and
    wherein the first crank arms and the second crank arms are positioned in parallel, a length of the second crankpin is equivalent to a length of the first crankpin or is longer than the length of the first crankpin, or, alternatively, the length of the first crankpin is equivalent to the length of the second crankpin or is longer than the length of the second crankpin, and the first crank arms are capable of passing through an inner side of the second crank arms and the second crank arms are capable of passing through an inner side of the first crank arms when the first crankshaft and the second crankshaft are rotating.

2. The internal combustion engine of claim 1, wherein an axis of the first crankpin is capable of being positioned further toward an axis of the second crankshaft and away from a straight line that extends parallel to the axes of the first and second crankshafts and that passes through a center between the axis of the first crankshaft and the axis of the second crankshaft, and
    an axis of the second crankpin is capable of being positioned further toward the axis of the first crankshaft and away from the straight line.

3. The internal combustion engine of claim 1, wherein the first piston and one of the two crankshafts are linked with a first one and a third one of the connecting rods, the first piston and the other of the two crankshafts are linked with a second one of the connecting rods, and
    wherein the second connecting rod is sandwiched between the first and third ones of the connecting rods.

4. The internal combustion engine of claim 1, wherein a distance between a cylinder axis extending centrally between the first cylinder and the second cylinder and a crank axis passing over a center of the first crankshaft is equal to a distance between the cylinder axis and a connecting point where the first piston and the first connecting rod are joined together, and wherein a distance between the cylinder axis and a crank axis passing over a center of the second crankshaft is equal to a distance between the cylinder axis and a connecting point where the second piston and the second connecting rod are joined together.

5. An internal combustion engine comprising:
    right and left crankcase halves joined together to form a crankcase;
    first and second cylinders provided, respectively, in the right and left crankcase halves;
    first and second crankshafts positioned parallel to each other within the crankcase;
    first and second pistons movably disposed, respectively, with the first and second cylinders; and first and second pairs of connecting rods, the first pair of connecting rods extending respectively from the first and second crankshafts and being connected to the first piston, and the second pair of connecting rods extending respectively from the first and second crankshafts and being connected to the second piston, wherein, when the first and second crankshafts rotate in opposite directions, positions of connection of one of the first pair of connecting rods with the first piston and the first crankshaft and positions of connection of other one of the first pair of connecting rods with the second piston and the second crankshaft are always symmetrical about a cylinder axis extending through a center of the first and second cylinders, wherein, when the first and second crankshafts rotate in opposite directions, positions of connection of one of the second pair of connecting rods with the second piston and the second crankshaft and positions of connection of other one of the second pair of connecting rods with the second piston and the second crankshaft are always symmetrical about the cylinder axis, and wherein a distance between crank axes passing through respective centers of the first and second crankshafts is smaller than inner diameters of the first and second cylinders.

6. The internal combustion engine of claim 5, wherein a distance between the cylinder axis and a first one of the crank axes passing through the center of the first crankshaft, a distance between the cylinder axis and a connecting portion where the one of the first pair of connecting rods is connected to the first piston, and a distance between the cylinder axis and a connecting portion where the other one of the second pair of connecting rods is connected to the second piston are all equal, and wherein a distance between the cylinder axis and a second one of the crank axes passing through the center of the second crankshaft, a distance between the cylinder axis and a connecting portion where the other one of the first pair of connecting rods is connected to the first piston, and a distance between the cylinder axis and a connecting portion where the one of the second pair of connecting rods is connected to the second piston are all equal.

* * * * *